United States Patent [19]
Furnish

[11] 3,917,316

[45] Nov. 4, 1975

[54] TRUNK STORING UTILITY TRAILER FOR AUTO

[75] Inventor: Richard P. Furnish, Cheyenne, Wyo.

[73] Assignee: Raymond Lee Organization Inc., a part interest

[22] Filed: Oct. 3, 1974

[21] Appl. No.: 511,645

[52] U.S. Cl............. 280/460 R; 296/26; 296/27; 280/78
[51] Int. Cl.² .......................................... B60P 3/34
[58] Field of Search ....... 296/26, 27; 280/460, 79.1, 280/78; 214/83, 24

[56] References Cited
UNITED STATES PATENTS

| 2,254,437 | 9/1941 | Marney | 296/26 |
| 2,549,018 | 4/1951 | Sarlo | 296/26 |
| 2,782,045 | 2/1957 | Hulbert | 280/79.1 X |
| 2,788,137 | 4/1957 | Harkness | 214/83.24 |

FOREIGN PATENTS OR APPLICATIONS

| 547,544 | 9/1942 | United Kingdom | 280/460 R |
| 476,593 | 12/1937 | United Kingdom | 280/460 R |
| 1,100,102 | 3/1955 | France | 280/460 R |
| 528,255 | 8/1921 | France | 280/460 R |

*Primary Examiner*—Leo Friaglia

[57] ABSTRACT

A trailer is stored in the trunk of an automobile and can be easily removed or returned for storage as desired. The trailer includes a rectangular hollow container open at the top with a flat horizontal bottom having front and rear ends. Suitable wheeled structures are secured to the container to facilitate operation.

1 Claim, 7 Drawing Figures

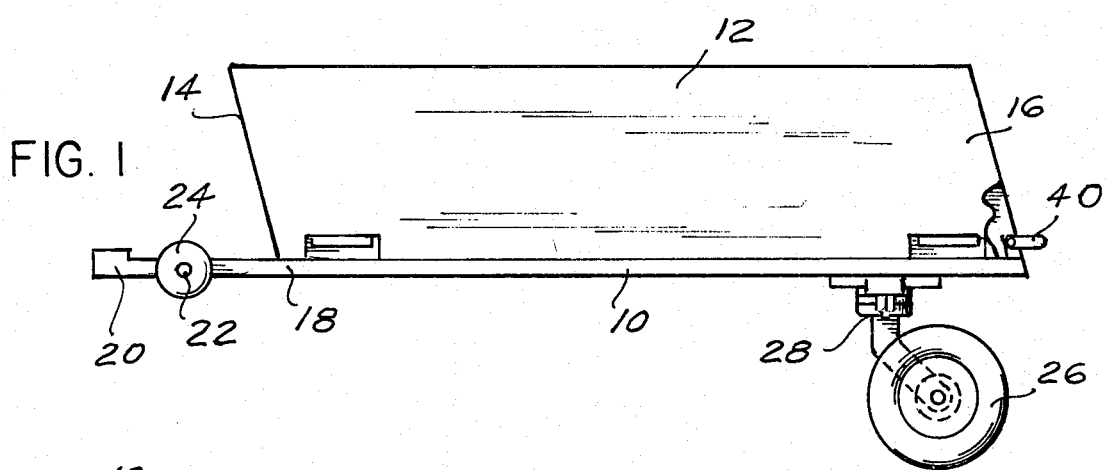
FIG. 1
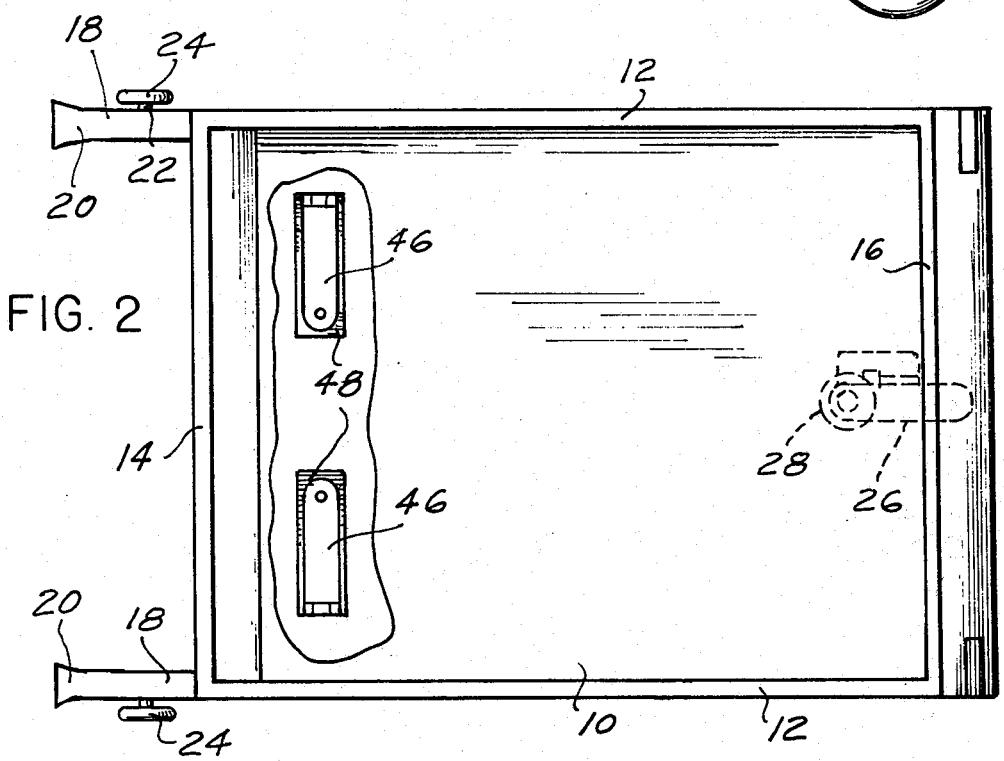
FIG. 2
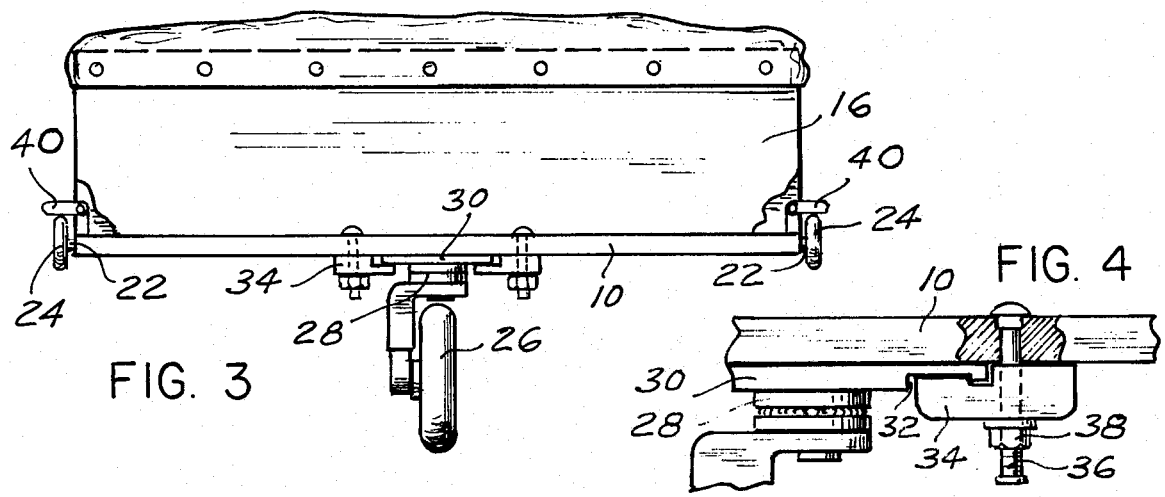
FIG. 3
FIG. 4

TRUNK STORING UTILITY TRAILER FOR AUTO

SUMMARY OF THE INVENTION

This invention is directed toward a small trailer which, when not in use, can be stored in the trunk of an automobile and which can be easily removed, placed into use and then returned to storage as desired.

To this end, the trailer includes a hollow rectangular container open at the top and having a flat horizontal bottom with front and rear ends, A swivel wheel arrangement, including a wheel which is freely rotatable as well as functioning as a swivel, is removably secured to the bottom at the rear end.

First and second horizontally elongated members are secured to the front end and extend longitudinally forward to be attached to rear bumper of automobile. First and second vertical wheels, each rotatable about a horizontal axle, are each secured to a corresponding one of these members by the corresponding axle, each axle extending at right angles to the corresponding member.

The first and second wheels are used to facilitate removal of the container from the trunk and replacement of the container in the trunk. The swivel wheel arrangement is employed when the trailer is in use.

BRIEF DESCRIPTION OF THE DRAWINGS

In the drawings:

FIG. 1 is a side view of the invention;

FIG. 2 is a top view thereof;

FIG. 3 is an end view thereof;

FIG. 4 is a detail view thereof;

DETAILED DESCRIPTION OF PREFERRED EMBODIMENTS

Figure 5:
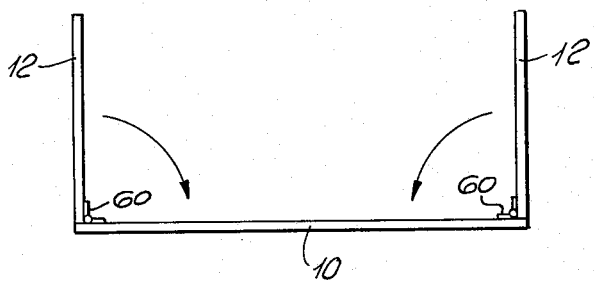
FIGS. 5 and 6 illustrate different steps in folding the invention when not in use.

Referring now to FIGS. 1 – 4, a horizontal flat rectangular bottom member 10 has vertical side walls 12 extending upward and joined by inclined front and rear walls 14 and 16, thus defining a hollow container open at its top.

Parallel horizontally coplanar elongated horizontal bars 18 extend forward and are integral with member 10. Hitch 20 is in turn made fast to rear bumper of automobile when in use.

Horizontal axles 22 are secured to each bar and extend thereout at right angles. A vertical wheel 24 is secured to each axle and is rotatable thereabout.

A vertical wheel 26 freely rotatable about a horizontal axle is secured by swivel 28 to horizontal plate 30 which has recesses 32 at opposite ends. Clamps 34 secured by screw 36 and bolt 38 to the underside of member 10 at the rear thereof detachably engage the recesses to removably hold the swivel and wheel in place. The swivel enables the wheel to rotate about a vertical axis.

Hinge down supports 46 can be folded into openings 48 in the member 10 to be out of the way or can be snapped into vertical upright position to act as legs.

Hold down type handles 40 are secured to the side walls at opposite ends.

Figure 6:
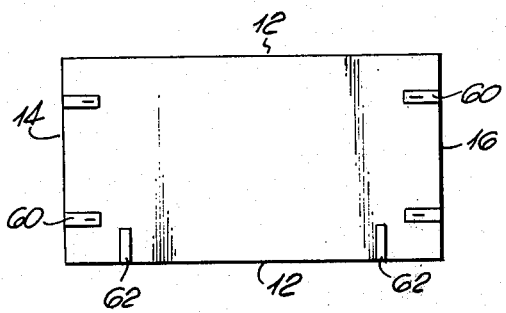
Figure 7:
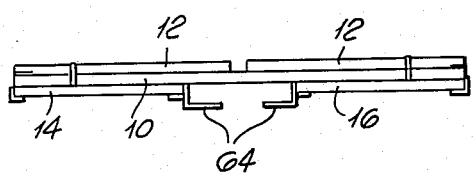
FIG. 7 illustrates the invention in folded position.

As shown in FIGS. 5, 6 and 7, the walls can be secured by hinges or other means 60 which can be disconnected for folding and holding brackets 62 can be employed. A wheel tie 64 can be used and the wheel disengaged whereby the structure can be collapsed for ease of storage.

While the invention has been described with detailed reference to the drawings, the protection sought is to be limited only by the terms of the claims which follow.

I claim:

1. A trailer adapted to be stored in the trunk compartment of an automobile when not in use and comprising:

a hollow container of rectangular shape open at the top and having a flat bottom horizontal surface with front and rear ends;

first and second parallel horizontally elongated members secured to the front end and extending longitudinally forward, said members having parallel horizontal top and bottom edges, the bottom edges being flush with the bottom surface of the container and having free ends disposed in front of the container;

first and second hitch members, each hitch member being secured to the free end of the corresponding elongated member;

first and second vertical wheels, each first and second wheel being rotatable about a horizontal axle secured to a corresponding one of the elongated members and extending outward at right angles thereto, the topmost peripheral point on each of the first and second wheels being disposed above the top horizontal edge of the corresponding one of the elongated members, the bottommost peripheral point on each of the first and second wheels being disposed below the bottom horizontal edge of the corresponding one of the elongated members;

a horizontal elongated plate having a recess at each end and disposed on the bottom surface of the container at the rear end thereof, said plate extending between the sides of the container but spaced from both these sides;

first and second clamps detachably securing said plate to said container, each clamp being secured to the rear end of the container and engaging a corresponding one of the recesses of the plate; and a structure rotatable about a vertical axis and secured to said plate, said structure extending below the plate and including a vertical wheel rotatable about a horizontal axis.

* * * * *